Figure 1:
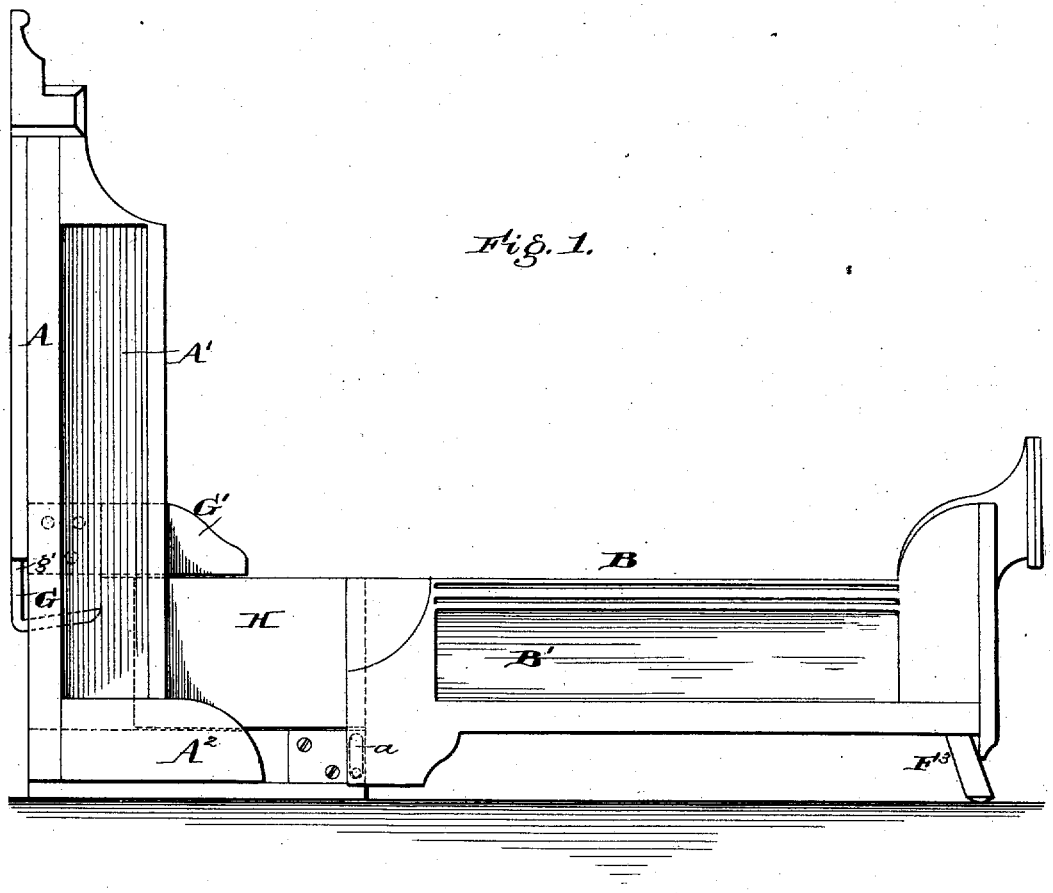

2 Sheets—Sheet 1.

F. BENNETT.

Assignor, by mesne assignments, to THE HALE & KILBURN MANUFACTURING COMPANY.

FOLDING BED.

No. 11,137. Reissued Jan. 6, 1891.

Witnesses:

Harry Drury

A. J. Dunn

Inventor:

Frederick Bennett

By his atty

[signature]

THE NORRIS PETERS CO., PHOTO-LITHO., WASHINGTON, D. C.

2 Sheets—Sheet 2.
F. BENNETT.
Assignor, by mesne assignments, to THE HALE & KILBURN MANUFACTURING COMPANY.
FOLDING BED.
No. 11,137. Reissued Jan. 6, 1891.
Fig. 2.
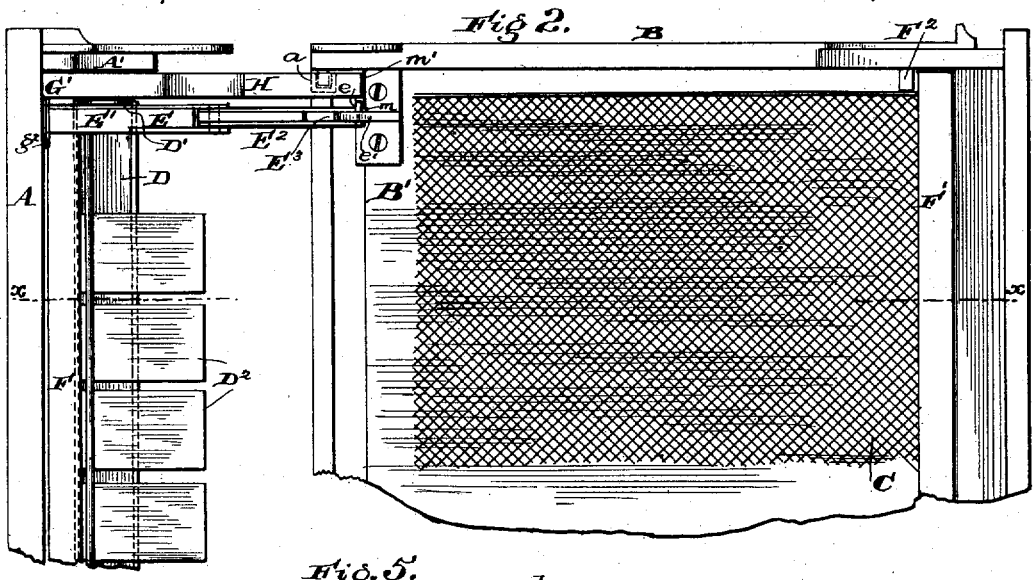
Fig. 5.
Fig. 3.
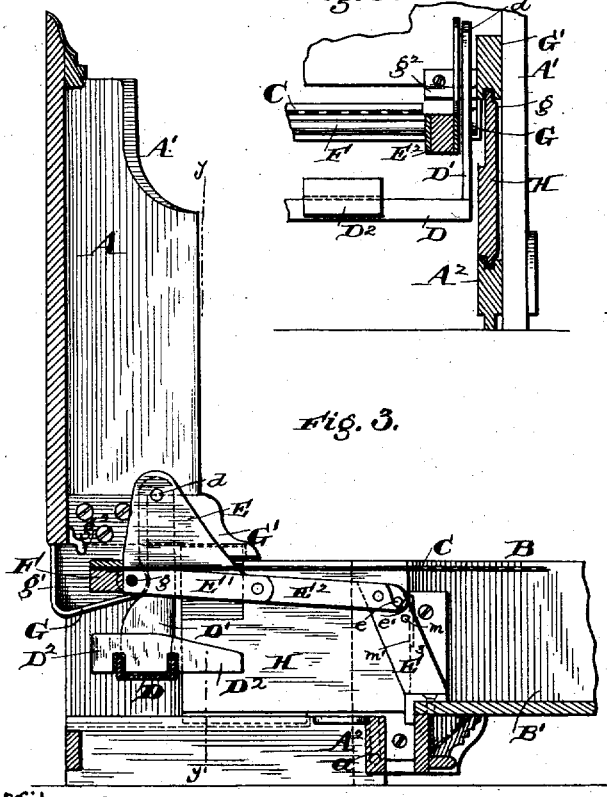
Fig. 4.
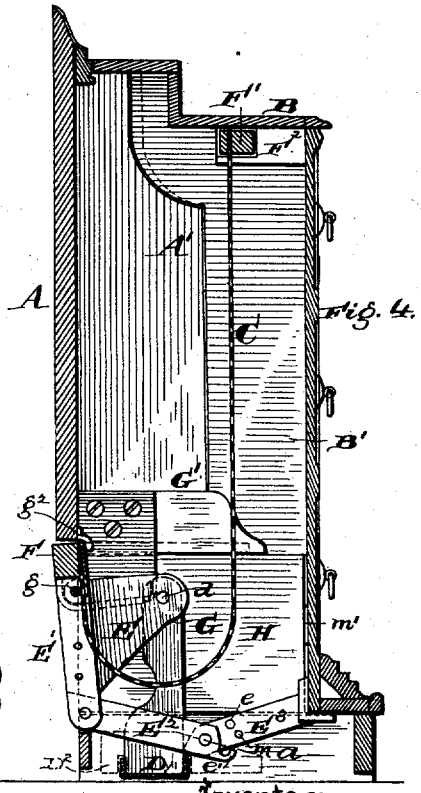
Witnesses:
Henry Denny
A. J. Bunn
Inventor:
Frederick R. Bennett
By his atty
Thos. Shaw
THE NORRIS PETERS CO., PHOTO-LITHO., WASHINGTON, D. C.

UNITED STATES PATENT OFFICE.

FREDERICK BENNETT, OF NEW YORK, N. Y., ASSIGNOR, BY MESNE ASSIGNMENTS, TO THE HALE & KILBURN MANUFACTURING COMPANY, OF PHILADELPHIA, PENNSYLVANIA.

FOLDING BED.

SPECIFICATION forming part of Reissued Letters Patent No. 11,137, dated January 6, 1891.

Original No. 428,368, dated May 20, 1890. Application for reissue filed September 26, 1890. Serial No. 366,266.

*To all whom it may concern:*

Be it known that I, FREDERICK BENNETT, of the city, county, and State of New York, have invented a new and Improved Folding Bed, of which the following is a full, clear, and exact description.

Reference is to be had to the accompanying drawings, forming a part of this specification, in which similar letters of reference indicate corresponding parts in all the figures.

Figure 1 is a side elevation of my new folding bed in open position. Fig. 2 is a plan view of one side of my new folding bed in open position, the wire bed-bottom being broken away at the head of the bed to show the weights and mechanism beneath. Fig. 3 is a sectional elevation on line *x x* of Fig. 2. Fig. 4 is a sectional elevation of the folding bed as it appears when closed, and Fig. 5 is a detail sectional view on the line *y y* of Fig. 3.

The invention will first be described in connection with the drawings, and then pointed out in the claims.

A represents the upright part of the bed, and B the bed-bottom, hinged to foot-pieces $A^2$ by pins entering small vertical slots *a*, which permit the end of the bed-bottom to have a slight vertical movement, which is effective in drawing the mattress C taut when the bed-bottom is wholly lowered and in holding it from yielding by weight on the mattress.

D represents the support or sling for the weights $D^2$. This support is provided with the end upright pieces D′, pivoted on pins *d*, on which the weight-support and weights are at all times free to swing. The said pins *d* are connected to the plates or arms E, so that these arms are in reality levers to which the weights are applied in a swinging support, so that the weights are always immediately under the pivots *d*. The said arms E are made a part of or are rigidly attached each to a link E′, which when the bed is closed stands in vertical position, as shown in Fig. 4, with the weight arms or levers E in horizontal position, and when the bed is opened stand in horizontal position, as shown in Fig. 3, with the weight-arms in vertical position. The said links E′ are rigidly connected at their outer end to the ends of the head-rail F, to which the mattress is attached, and to their inner ends are pivoted the intermediate sections $E^2$. These sections are pivoted to the arms $E^3$, rigidly attached to the floor B′ of the bed-bottom. Each link E′ rests upon a track G, attached to a cleat G′, secured to the inner surface of each side wall A′ of the upright portion of the bed. Anti-friction rollers *g* are journaled on gudgeons attached to the links E′ to insure easy movement, and the tracks are upturned to form stops *g′* to limit the backward movement of the rail F, links E′, weight-arms E, and the weight-support D and weights. Above each track is an overhanging lip $g^2$, which retains the rail F and prevents displacement when the bed is closed, as illustrated clearly in Fig. 4. At each side of the bed is a sliding splice-board H, held between the foot-piece $A^2$ and the cleat G′. These splice-boards when the bed is opened are drawn out, as shown in Figs. 1 and 3, and they close the space which would otherwise exist between the ends of the side boards B′ of the bed-bottom and the edges of the vertical side pieces A′. This outward movement of said splice-boards is effected by studs *m* on the arms $E^3$ coming in contact with flanges *m′* on the said boards. On closing the bed the said splice-boards are forced inward by contact with the edge of the floor B′ of the bed-bottom.

*e* represents a short pin or stud fixed in the arms $E^3$ to serve as a stop or limit pin to the pivotal actions of the sections $E^2$, and *e′* represents a projection or finger at the end of the sections $E^2$, which strike the limit-pin *e*, as shown clearly in Fig. 3, to prevent the section from swinging downward too far when the bed is opened—that is, when the bed is open the end of the sections $E^2$ which is hinged to the links E′ cannot drop below a straight line with the links E′. If pressure were applied at the hinge between the two sections $E^2$ and links E′ when the bed is open, the pins *e* and fingers *e′* would effectually prevent the sections and links from being depressed.

The operation is as follows: The bed being closed, the parts assume the position shown in Fig. 4—that is, the rail F is forced back fully under the stops $g^2$, and the links E′ are turned down to vertical position, while the weight-arms E, intermediate sections $E^2$, and arms $E^3$ are in substantially horizontal position. At this position the counter-weights exert their maximum force, being held at the ends of the weight-levers. In opening the bed the bottom, turning first on the hinge *a*, swings the arms $E^3$ upward and outward in the arc of a circle. This movement, through the intermediate sections $E^2$, draws outward the lower ends of the links E′ and swings upward the weight-arms E, thus shifting upward in the arc of a circle the points of support of the weights, and at the same time drawing forward on the tracks G the said links, rail F, weight-arms E, and weight-support and weights. As the upward movement of the arms $E^3$ progresses the limit-studs *e* thereof strike the fingers *e′* of the intermediate section $E^2$, and from this point the arms $E^3$ and said sections act together as rigid bent levers, and then lift the links E′ to horizontal position and turn the weight arms or levers to vertical position, as shown in Fig. 3. At this position the bed is fully opened, and the links E′, intermediate sections $E^2$, and arms $E^3$ brace back the rail F, or, rather, force it back and draw the mattress C taut. In the meantime pins *m* will have come in contact with the flanges *m′*, so that the splice-boards H will be drawn out as the bed-bottom descends.

The tension put on the mattress serves as a force to assist in closing the bed at the start. As soon as the foot is slightly lifted from the floor, the arms $E^3$ are pitched forward and downward, which throws down the intermediate sections $E^2$ and the ends of the links E′, and pitches forward the weight-arms E, so that the counter-weights are brought into effective action at the ends of the levers to assist in closing the bed. The weights act through the weight-arms, the links E′, intermediate sections $E^2$, and the arms $E^3$, as will be clearly understood from Fig. 4.

The turning back of the mattress-rail F under the lips $g^2$ obviates injurious bending to the mattress.

The foot-rail F′ of the mattress may be held by the cleats $F^2$, or by any other suitable means, and the legs $F^3$ may be of the construction shown, described, and claimed in my application for patent, filed November 12, 1889, Serial No. 330,232, or they may be of any other appropriate construction.

Having thus described my invention, what I claim as new, and desire to secure by Letters Patent, is—

1. In a folding bed, the vertical stationary frame and the bed-bottom hinged thereto, provided with rigid arms on its lower edge, in combination with the intermediate sections $E^2$, head-rail F, provided with the weight-levers E and links E′, hinged to the sections $E^2$, and the weight frame or support pivoted to the levers E, the said head-rail being attached to the mattress and supported loosely at its ends, substantially as described.

2. In a folding bed, the head-rail F, supported upon curved tracks G, secured to the side pieces of the upright portion of the frame and provided near each end with the links E′, each formed with a weight-arm E and having the mattress secured thereto, the opposite end of the mattress being secured to the foot-piece of the folding portion of the bed, in combination with the weight-support D D′, pivoted to the ends of the said arms E, the intermediate sections $E^2$, hinged to the links E′, and the arms $E^3$, attached to the bed-bottom and hinged to the intermediate sections $E^2$, substantially as described.

3. In a folding bed, the upright portion provided with the curved tracks G and overhanging stops $g^2$, and the head-rail F, to which the mattress is attached, supported upon its ends on said tracks, in combination with links E′, weight-arms E, weight-supports D, pivoted to the said arms E, sections $E^2$, hinged to the links E′, and the arms $E^3$, secured to the bed-bottom, substantially as described.

4. In a folding bed, the combination, with the upright portion provided with the sliding side or splice boards H; of the folding part provided with a projection *m* to engage a flange *m′* on said splice-board for operating the same, substantially as described.

5. In a folding bed, the combination of a bed structure consisting of the upright portion and the bed-bottom or movable bed-bottom portion hinged to the upright portion and forming a gap between the upright portion and side rails of the movable bed-bottom portion when the latter is down, and movable splice-boards sustained at all times by the bed structure and arranged in line with the side rails of the bed-bottom portion and adapted to be shifted in guideways on the said bed structure into position for closing the gap when the bed-bottom or movable portion is lowered.

6. In a folding bed, the combination of the upright portion, the bed-bottom or movable portion hinged to the upright portion and forming a gap between the upright portion and side rails of the movable bed-bottom portion when the latter is down, movable splice-boards arranged in line with the side rails of the bed-bottom portion and adapted to be moved into position for closing the gap when the bed-bottom or movable portion is lowered, guides for said splice-boards carried on the upright portion, and means moved by the bed-bottom or movable portion acting upon said splice-boards to automatically draw them out into position upon lowering the bed-bottom or movable portion.

7. In a folding bed, a stationary part and a movable bed-bottom portion hinged to the stationary part, in combination with movable splice-boards in line with the side rails of the movable bed-bottom portion, and a connection between the movable bed-bottom portion and splice-boards for moving the latter upon opening or closing the bed.

8. In a folding bed, a stationary part and a movable bed-bottom portion hinged to the stationary part, in combination with movable splice-boards in line with the side rails of the bed-bottom portion, a connection between the movable bed-bottom portion and splice-boards for moving the latter upon opening or closing the bed, and counter-weights to counterbalance the movable bed-bottom portion and assist it in operating the splice-boards upon closing the bed.

In testimony of which invention I hereunto set my hand.

FREDERICK BENNETT.

Witnesses:
W. F. SMITH,
IRVING D. COLE.